US012573624B2

(12) United States Patent　　(10) Patent No.: US 12,573,624 B2
Noh et al.　　(45) Date of Patent: Mar. 10, 2026

(54) CATHODE ACTIVE MATERIAL FOR LITHIUM SECONDARY BATTERY AND LITHIUM SECONDARY BATTERY INCLUDING THE SAME

(71) Applicant: SK ON CO., LTD., Seoul (KR)

(72) Inventors: Mi Jung Noh, Daejeon (KR); Kyung Bin Yoo, Daejeon (KR); Kook Hyun Han, Daejeon (KR)

(73) Assignee: SK On Co., Ltd., Seoul (KR)

( * ) Notice: Subject to any disclaimer, the term of this patent is extended or adjusted under 35 U.S.C. 154(b) by 579 days.

(21) Appl. No.: 18/075,810

(22) Filed: Dec. 6, 2022

(65) Prior Publication Data

US 2023/0178727 A1　Jun. 8, 2023

(30) Foreign Application Priority Data

Dec. 7, 2021　(KR) ......................... 10-2021-0173740

(51) Int. Cl.
　　H01M 4/525　(2010.01)
　　H01M 4/02　(2006.01)
　　H01M 4/505　(2010.01)
　　H01M 10/0525　(2010.01)
(52) U.S. Cl.
　　CPC .......... H01M 4/525 (2013.01); H01M 4/505 (2013.01); *H01M 2004/021* (2013.01); *H01M 2004/028* (2013.01); *H01M 10/0525* (2013.01)
(58) Field of Classification Search
　　CPC .. H01M 4/525; H01M 4/505; H01M 10/0525; H01M 2004/021; H01M 2004/028
　　See application file for complete search history.

(56) References Cited

U.S. PATENT DOCUMENTS

| | | | | |
|---|---|---|---|---|
| 2015/0188136 A1* | 7/2015 | Mori | ...................... | C01G 53/42 |
| | | | | 429/223 |
| 2016/0013472 A1* | 1/2016 | Mitsumoto | ............ | C01G 53/50 |
| | | | | 429/231.1 |
| 2016/0056458 A1* | 2/2016 | Tamura | ................. | H01M 4/525 |
| | | | | 252/182.1 |

(Continued)

FOREIGN PATENT DOCUMENTS

| | | |
|---|---|---|
| EP | 3974391 A1 | 3/2022 |
| JP | 2020-172422 A | 10/2020 |

(Continued)

OTHER PUBLICATIONS

Extended European Search Report for the European Patent Application No. 22211793.9 issued by the European Patent Office on May 24, 2023.

(Continued)

*Primary Examiner* — Matthew J Merkling
(74) *Attorney, Agent, or Firm* — IP & T GROUP LLP

(57) ABSTRACT

A cathode active material for a lithium secondary battery according to an embodiment of the present invention has a structure of a lithium-nickel-based composite oxide. A crystallite size ratio obtained by an XRD analysis is in a range from 1.5 to 3.5, and D(003) exceeds 200 nm. The crystallite size is adjusted to promote movement of lithium ions in the cathode active material so that an initial efficiency of a lithium secondary battery is improved.

10 Claims, 1 Drawing Sheet

(56) References Cited

U.S. PATENT DOCUMENTS

| 2016/0164093 A1* | 6/2016 | Inoue | H01M 4/525 |
| | | | 429/223 |
| 2017/0358798 A1* | 12/2017 | Kageura | H01M 10/0525 |
| 2020/0313183 A1 | 10/2020 | Kadowaki et al. | |
| 2022/0131139 A1* | 4/2022 | Kaneda | H01M 4/505 |

FOREIGN PATENT DOCUMENTS

| KR | 10-0821523 B1 | 4/2008 |
| KR | 10-2016-0037947 A | 4/2016 |
| KR | 10-2017-0095888 A | 8/2017 |
| KR | 10-2019-0026061 A | 3/2019 |
| KR | 10-2293034 B1 | 8/2021 |

OTHER PUBLICATIONS

Office Action for Korean Patent Application No. 10-2021-0173740 issued by the Korean Patent Office on Mar. 13, 2025.

* cited by examiner

CATHODE ACTIVE MATERIAL FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2021-0173740 filed on Dec. 7, 2021 in the Korean Intellectual Property Office (KIPO), the entire disclosure of which is incorporated by reference herein.

BACKGROUND

1. Field

The present invention relates to a cathode active material for a lithium secondary battery and a lithium secondary battery including the same. More particularly, the present invention relates to a cathode active material containing lithium and nickel, and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as an eco-friendly power source of an electric automobile, a hybrid vehicle, etc.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape.

As an application range of the lithium secondary batteries is extended to large devices such as the electric vehicle, a high-nickel (High-Ni)-based lithium oxide having an increased nickel content is used as a cathode active material for obtaining high capacity of the lithium secondary battery. However, as the content of nickel in the cathode active material increases, stability of a crystal structure in an active material particle may be decreased. Accordingly, high capacity properties from the high nickel content may not be sufficiently implemented due to reduction of an efficiency of the active material particles.

For example, Korean Registered Patent Publication No. 10-0821523 discloses a cathode active material including a high nickel-based lithium composite oxide.

SUMMARY

According to an aspect of the present invention, there is provided a cathode active material for a lithium secondary battery having improved charge/discharge properties and reliability.

According to an aspect of the present invention, there is provided a lithium secondary battery including the cathode active material.

A cathode active material for a lithium secondary battery has a structure of a lithium-nickel-based composite oxide. A crystallite size ratio obtained by an X-ray diffraction (XRD) analysis defined by Equation 1 is in a range from 1.5 to 3.5, and D(003) exceeds 200 nm.

$$\text{crystallite size ratio} = D(003)/D(104) \qquad \text{[Equation 1]}$$

In Equation 1, D(003) is a crystallite size of a (003) plane measured by the XRD analysis, and D(104) is a crystallite size of a (104) plane measured by the XRD analysis.

In some embodiments, the lithium-nickel-based composite oxide may be represented by Chemical Formula 1 below.

$$Li_bNi_{1-x-y-z}Co_xMn_yM_zO_{2+a} \qquad \text{[Chemical Formula 1]}$$

In Chemical Formula 1, $0 \le x \le 0.15$, $0 \le y \le 0.15$, $0 \le z \le 0.1$, $-0.5 \le a \le 0.1$, $0.9 \le b \le 1.2$, and M includes at least one element selected from the group consisting of Mg, Sr, Ba, B, Al, Si, Ti, Zr, Y and W.

In some embodiments, the crystallite size ratio may be in a range from 2.5 to 3.2.

In some embodiments, the D(003) may be greater than 200 nm, and less than or equal to 900 nm.

In some embodiments, the D(003) may be in a range from 230 nm to 900 nm.

In some embodiments, the D(104) may be in a range from 90 nm to 300 nm.

In some embodiments, the D(104) may be in a range from 90 nm to 200 nm.

In some embodiments, nickel may be included in the largest molar ratio among elements except for lithium and oxygen in the lithium-nickel-based composite oxide.

In some embodiments, the molar ratio of nickel may be in a range from 0.8 to 0.95.

In some embodiments, the lithium-nickel-based composite oxide may have a single particle shape.

A lithium secondary battery includes a cathode including a cathode active material layer that includes the cathode active material for a lithium secondary battery according to the above-described embodiments, and an anode facing the cathode.

In a cathode active material for a lithium secondary battery according to embodiments of the present invention, a ratio of a crystallite size of a (003) plane to a crystallite size of a (104) plane measured by an XRD analysis may be maintained in an appropriate range. Accordingly, stability of a crystal structure may be obtained while maintaining a lithium ion movement distance in the cathode active material within an appropriate range.

For example, the cathode active material may have a high-Ni composition while maintaining the crystallite size ratio. Accordingly, increased power and capacity may be provided with high efficiency and stability of chemical/crystal structure may be improved so that operational stability and increased life-span properties may be provided.

DETAILED DESCRIPTION OF THE EMBODIMENTS

According to embodiments of the present invention, a cathode active material for a lithium secondary battery having a high-nickel (high-Ni) composition and having predetermined crystal properties.

Further, a lithium secondary battery including the cathode active material and having improved capacity, efficiency and stability is provided.

Hereinafter, embodiments of the present invention will be described in detail with reference to exemplary embodiments and the accompanying drawings. However, those skilled in the art will appreciate that such embodiments and drawings are provided to further understand the spirit of the present invention and do not limit subject matters to be protected as disclosed in the detailed description and appended claims.

Figure 1:
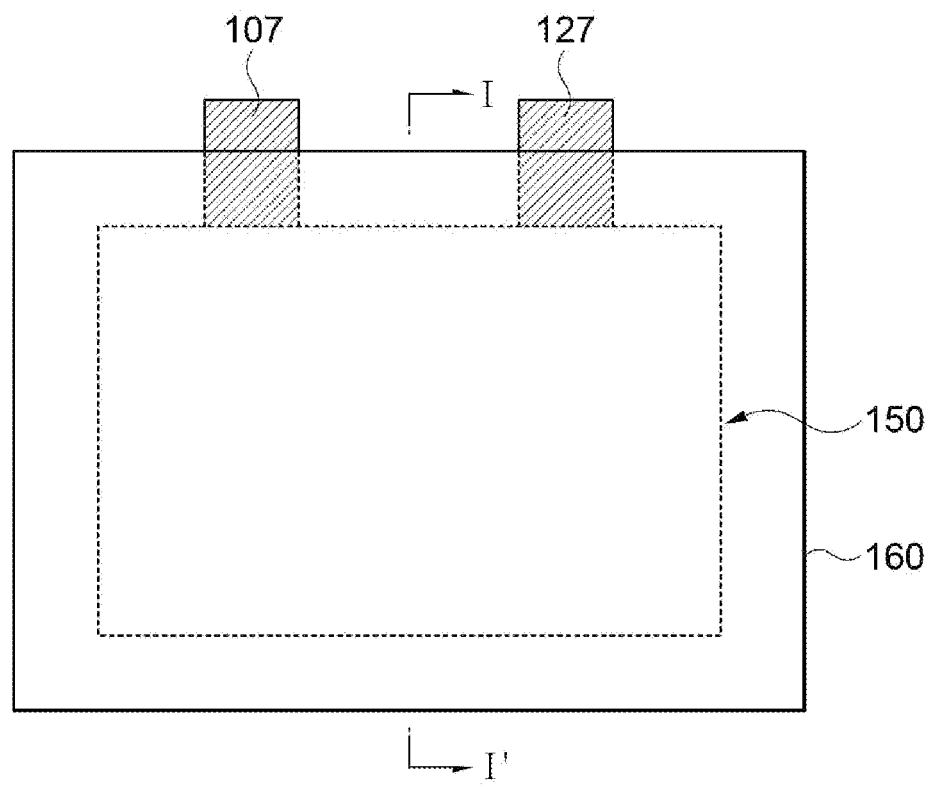
FIGS. 1 and 2 are a schematic plan view and a cross-sectional view, respectively, illustrating a lithium secondary battery in accordance with exemplary embodiments.
Figure 2:
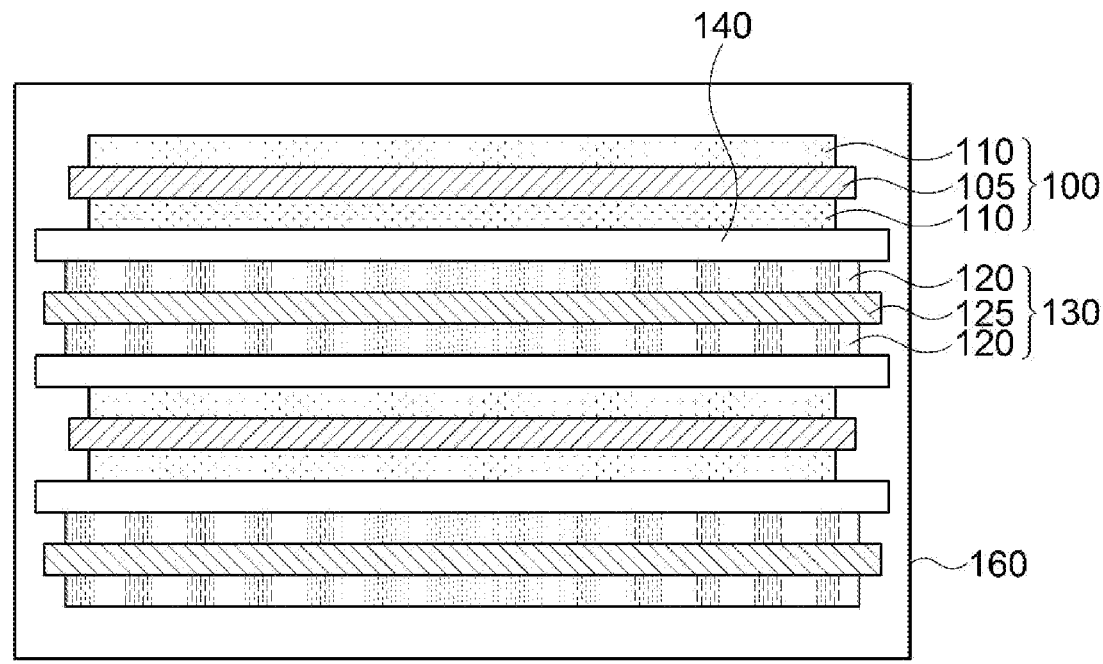

FIGS. 1 and 2 are a schematic plan view and a cross-sectional view, respectively, illustrating a lithium secondary battery in accordance with exemplary embodiments. Hereinafter, a cathode active material for a lithium secondary battery and a lithium secondary battery including the same will be described together with reference to FIGS. 1 and 2.

Referring to FIGS. 1 and 2, a lithium secondary battery may include an electrode assembly including a cathode 100 and an anode 130. In some embodiments, a separation layer 140 may be disposed between the cathode and the anode, and the electrode assembly may be accommodated together with an electrolyte in a case 160.

The cathode 100 may include a cathode active material layer 110 formed by coating a cathode active material on a cathode current collector 105. The cathode active material may include a compound capable of reversibly intercalating and de-intercalating lithium ions.

In exemplary embodiments, the cathode active material may include a lithium-transition metal composite oxide. For example, the lithium-transition metal composite oxide may include nickel (Ni), and may further include at least one of cobalt (Co) and manganese (Mn). For example, the cathode active material may include a nickel-cobalt-manganese (NCM)-based lithium oxide.

In exemplary embodiments, Ni may be included in the largest content (molar ratio or atomic %) among elements except for lithium and oxygen included in the cathode active material.

For example, the content of Ni may be 0.6 or more, preferably 0.7 or more, and more preferably 0.8 or more. In a preferable embodiment, the molar ratio of Ni may be 0.8 to 0.95.

In some embodiments, the cathode active material may include a lithium-nickel-based composite oxide represented by Chemical Formula 1 below.

$$Li_bNi_{1-x-y-z}Co_xMn_yM_zO_{2+a} \qquad \text{[Chemical Formula 1]}$$

In Chemical Formula 1, $0 \leq x \leq 0.15$, $0 \leq y \leq 0.15$, $0 \leq z \leq 0.1$, $-0.5 \leq a \leq 0.1$, and $0.9 \leq b \leq 1.2$. M may include at least one element selected from Mg, Sr, Ba, B, Al, Si, Ti, Zr, Y and W.

Ni may serve as a transition metal related to power and capacity of the lithium secondary battery. Accordingly, the high-Ni composition as described above may be employed in the cathode active material, so that a high-capacity cathode and a high-capacity lithium secondary battery may be implemented.

However, as the content of Ni is increased, long-term storage stability and life-span stability of the cathode or the secondary battery may be relatively deteriorated. However, according to exemplary embodiments, life-span stability and capacity retention may be improved by using Mn while maintaining electrical conductivity by including Co.

The element represented as M in Chemical Formula 1 may be provided as a coating element or a doping element.

The cathode active material particles may be passivated by the coating element or the doping element, so that stability against a penetration of an external object and life-span may be further improved.

The cathode active material may include particles of the lithium-transition metal composite oxide or the lithium-nickel-based composite oxide. For example, an amount of the lithium-nickel-based composite oxide particles may be 50 weight percent (wt %) or more based on a total weight of the cathode active material. Preferably, the amount of the lithium-nickel-based composite oxide particles may be 60 wt % or more, 70 wt % or more, 80 wt % or more, or 90 wt % or more based on the total weight of the cathode active material.

In an embodiment, the cathode active material may substantially consist of the particles of the lithium-nickel-based composite oxide.

In exemplary embodiments, a crystallite size ratio obtained by an X-ray diffraction (XRD) analysis of the cathode active material particles or the lithium-nickel-based composite oxide particles represented by Equation 1 below may be in a range from 1.5 to 3.5.

$$\text{crystallite size ratio} = D(003)/D(104) \qquad \text{[Equation 1]}$$

In Equation 1, D(003) is a crystallite size of a (003) plane measured by the XRD analysis, and D(104) is a crystallite size of a (104) plane measured by the XRD analysis.

The crystallite size may be obtained by calculating through a Scherrer equation (Equation 2 below) using a full width at half maximum (FWHM) obtained by the XRD analysis.

$$L = \frac{0.9\lambda}{\beta\cos\theta} \qquad \text{[Equation 2]}$$

In the Equation 2 above, L is a crystallite size, $\lambda$ is an X-ray wavelength, $\beta$ is a FWHM of a corresponding peak at the (003) plane or the (104) plane, and $\theta$ is a diffraction angle.

For example, the XRD analysis may be performed using a Cu K$\alpha$ ray as a light source for a dried powder of the lithium-transition metal composite oxide particles in a diffraction angle ($2\theta$) range of $10°$ to $120°$ at a scan rate of $0.0065°$/step.

D(104) may act as a factor affecting movement of lithium ions. The cathode active material may have a layered structure, and lithium ions and transition metals may be present in different layers.

During charging/discharging operation of the lithium secondary battery, an interlayer movement of lithium ions may occur, and an energy may be generated by an electrochemical reaction.

For example, if a defect is included in a crystal structure of the (104) plane, the crystal of the (104) plane may be fragmented, and D(104) may be decreased. Accordingly, sites where lithium ions are to be inserted at the (104) plane may be removed or reduced, and the movement of lithium ions may be blocked or prevented. As a result, sufficient initial efficiency and initial capacity of the lithium secondary battery may not be achieved.

If D(104) is excessively increased, a movement distance of lithium ions may be excessively increased, thereby reducing capacity and efficiency.

Thus, when D(104) of the cathode active material is maintained in an appropriate range, the movement of lithium ions may be promoted to sufficiently implement the initial efficiency and capacity of the lithium secondary battery.

However, an absolute value of D(104) may fluctuate depending on reaction conditions and process conditions for synthesizing the cathode active material, and thus may not be easily controlled. Thus, a relative ratio of D(104) to a reference crystallite size may be controlled so that a lithium ion migration in consideration of overall properties of the crystal structure may be promoted.

In exemplary embodiments, D(003) may be used as the reference crystallite size. For example, if D(003) is excessively increased, a particle aspect ratio may increase to degrade power/capacity. In this case, the crystallite size ratio of the cathode active material may be controlled in an appropriate range by D(104), so that overall lithium movement and lithium diffusion properties may be improved.

In some embodiments, the crystallite size ratio may be in a range from 2.5 to 3.2, preferably in a range from 2.5 to 3.1, more preferably in a range from 2.5 to 3.0.

In exemplary embodiments, D(003) may exceed 200 nm. If the absolute size of D(003) exceeds 200 nm, a grain strength may be increased, and an inter-grain area or an inter-grain boundary may be reduced to prevent particle cracks.

Thus, a gas generation due to repeated charge/discharge may be suppressed and cracks caused by volume contraction/expansion may also be prevented. Therefore, stable capacity properties may be provided even in a high-temperature environment and life-span properties of the lithium secondary battery may be improved.

In a preferable embodiment, D(003) may be greater than 200 nm and may be less than or equal to 900 nm. For example, D(003) may be in a range from 230 nm to 900 nm. More preferably, D(003) may be greater than 200 nm and may be less than or equal to 400 nm, e.g., greater than 200 nm and less than 310 nm.

In some embodiments, D(104) may be in a range from 90 nm to 300 nm. In an embodiment, D(104) may be in a range from 95 nm to 200 nm, preferably from 95 nm to 150 nm, more preferably from 95 nm to 130 nm.

Individual values of the crystallite sizes may be adjusted together with the above-described crystallite size ratio, so that lithium ion migration and stability of the cathode active material particles may be more efficiently managed.

In some embodiments, the lithium-nickel-based composite oxide may have a single particle shape. For example, an average particle diameter expressed by D50 based on a cumulative volume distribution may be in a range from 1 μm to 20 μm, preferably from 1 μm to 10 μm, or from 2 μm to 10 μm.

The term "single particle" used herein is intended to exclude a secondary particle structure in which, e.g., 10 or more primary particles substantially form one particle. The single particle does not exclude a monolithic form in which, e.g., less than 10 individual particles are adjacent or adhered to each other.

According to exemplary embodiments, the above-described cathode active material may be manufactured by processes as described below.

In exemplary embodiments, active material metal sources may be prepared. The active material metal sources may include a nickel source, a manganese source and a cobalt source.

Examples of the nickel source include nickel sulfate (NiSO$_4$), nickel hydroxide (Ni(OH)$_2$), nickel nitrate (Ni (NO$_3$)$_2$), nickel acetate (Ni(CH$_3$CO$_2$)$_2$), a hydrate thereof, etc.

Examples of the manganese source include manganese sulfate (MnSO$_4$), manganese hydroxide (Mn(OH)$_2$), manganese nitrate (Mn(NO$_3$)$_2$), manganese acetate (Mn (CH$_3$CO$_2$)$_2$, a hydrate thereof, etc.

Examples of the cobalt source include cobalt sulfate (CoSO$_4$), cobalt hydroxide (Co(OH)$_2$), cobalt nitrate (Co (NO$_3$)$_2$), cobalt carbonate (CoCO$_3$), a hydrate thereof.

In a preferable embodiment, nickel sulfate, manganese sulfate and cobalt sulfate may be used as the nickel source, the manganese source and the cobalt source, respectively.

For example, a transition metal solution including the above-described active metal sources may be formed. In exemplary embodiments, when preparing the transition metal solution, a pH may be adjusted to 10 or more, for example, in a range from 10 to 12 using, e.g., ammonia water (NH$_3$H$_2$O), In exemplary embodiments, an active material precursor may be obtained by mixing the above-described active material metal sources and reacting by, e.g., a co-precipitation method. For example, the active material precursor may be prepared in the form of nickel-manganese-cobalt hydroxide.

A precipitating agent and/or a chelating agent may be used to promote the co-precipitation reaction. The precipitating agent may include an alkaline compound such as sodium hydroxide (NaOH), sodium carbonate (Na$_2$CO$_3$), etc. The chelating agent may include, e.g., aqueous ammonia (e.g., NH$_3$H$_2$O), ammonium carbonate (e.g., NH$_3$HCO$_3$), etc.

For example, the transition metal solution may be reacted by adding the precipitating agent at a temperature in a range from about 50° C. to 70° C. In an embodiment, a molar ratio of the precipitating agent (e.g., NaOH) to the number of moles of transition metals contained in the transition metal solution may be greater than 1 and less than 3, and may be, e.g., in a range from 1.4 to 2.5.

In some embodiments, a cathode active material precursor may be obtained by heat-treating the precipitated product. For example, the cathode active material precursor having a stabilized crystal structure may be formed by the heat-treatment at a temperature in a range from about 100° C. to 150° C. for 10 to 30 hours. Preferably, the heat-treatment temperature may be in a range from about 100° C. to 130° C., and the heat-treatment may be performed for 10 to 20 hours.

The cathode active material precursor may be reacted with a lithium source.

The lithium source may include, e.g., lithium carbonate (Li$_2$CO$_3$), lithium nitrate (LiNO$_3$), lithium acetate (CH$_3$COOLi), lithium oxide (Li$_2$O), lithium hydroxide (LiOH), etc. These may be used alone or in a combination thereof. Preferably, lithium hydroxide may be used as the lithium source.

In some embodiments, a compound including Mg, Sr, Ba, B, Al, Si, Ti, Zr, Y or W as an element represented by M in Chemical Formula 1 may be used together. For example, the compound may be a salt (e.g., a carbonate, etc.), a hydroxide or an oxide of the element.

M may be present by substituting a portion of Ni, Co and Mn in the active material particle as a dopant of the cathode active material, or may be present on a surface of the active material particle as a surface coating material.

For example, the cathode active material precursor may be mixed with the lithium source and a calcination may be performed to prepare lithium-nickel-based composite oxide particles as a cathode active material. For example, the calcination may be performed at a temperature ranging from about 600° C. to 850° C., preferably from 680° C. to 850° C.

In some embodiments, a washing process may be further performed on the lithium-nickel-based composite oxide particles generated as the cathode active material. The washing process may include washing with an aqueous or organic solvent. Lithium impurities (e.g., $Li_2O$, $Li_2CO_3$, LiOH, etc.) remaining on the surface of the lithium-nickel-based composite oxide particles may be removed by the washing process.

In an embodiment, after the washing process, a post-calcination process may be further performed. The post-calcination process may be performed, e.g., at a temperature ranging from about 250° C. to 500° C.

The crystal structure on the surface of the cathode active material may be further stabilized by the post-calcination process, and the above-described crystallite size-related values may be uniformly maintained.

Referring to FIGS. 1 and 2 again, a slurry may be prepared by mixing and stirring the above-described cathode active material with a binder, a conductive material and/or a dispersive agent in a solvent. The slurry may be coated on the cathode current collector 105, and then dried and pressed to form the cathode.

The cathode current collector 105 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 110 may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 formed by coating an anode active material on a surface of the anode current collector 125.

The anode active material may include a material commonly used in the related art which may be capable of adsorbing and ejecting lithium ions. For example, a carbon-based material such as a crystalline carbon, an amorphous carbon, a carbon complex or a carbon fiber, a lithium alloy, a silicon (Si)-based compound, tin, etc., may be used.

The amorphous carbon may include a hard carbon, cokes, a mesocarbon microbead (MCMB), a mesophase pitch-based carbon fiber (MPCF), etc.

The crystalline carbon may include a graphite-based material such as natural graphite, graphitized cokes, graphitized MCMB, graphitized MPCF, etc.

The lithium alloy may further include aluminum, zinc, bismuth, cadmium, antimony, silicon, lead, tin, gallium, indium, etc.

The silicon-based compound may include, e.g., silicon oxide (e.g., SiOx, 0<x<2) or a silicon-carbon composite compound such as silicon carbide (SiC).

In some embodiments, a slurry may be prepared by mixing and stirring the anode active material with a binder, a conductive material and/or a dispersive agent in a solvent. The slurry may be coated on the anode current collector, and then dried and pressed to form the anode 130.

The binder and the conductive material substantially the same as or similar to those used for the cathode active material layer 110 may be used in the anode 130. In some embodiments, the binder for forming the anode 130 may include an aqueous binder such as styrene-butadiene rubber (SBR), and carboxymethyl cellulose (CMC) may also be used as a thickener.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation.

In exemplary embodiments, an electrode cell may be defined by the cathode 100, the anode 130 and the separation layer 140, and a plurality of the electrode cells may be stacked to form the electrode assembly 150 that may have e.g., a jelly roll shape. For example, the electrode assembly 150 may be formed by winding, laminating or folding of the separation layer 140.

The electrode assembly 150 may be accommodated together with an electrolyte in a case 160 to define the lithium secondary battery. In exemplary embodiments, a non-aqueous electrolyte may be used as the electrolyte.

The non-aqueous electrolyte may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, SCN, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination of two or more therefrom.

As illustrated in FIG. 1, electrode tabs (a cathode tab and an anode tab) may protrude from the cathode current collector 105 and the anode current collector 125 included in each electrode cell to one side of the case 160. The electrode tabs may be welded together with the one side of the case 160 to be connected to an electrode lead (a cathode lead 107 and an anode lead 127) that may be extended or exposed to an outside of the case 160.

The lithium secondary battery may be manufactured in, e.g., a cylindrical shape using a can, a square shape, a pouch shape or a coin shape.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

(1) Preparation of Cathode Active Material $NiSO_4$, $CoSO_4$ and $MnSO_4$ were mixed in a molar ratio of 80:10:10, respectively, using distilled water from which dissolved oxygen was removed by bubbling with $N_2$ for 24 hours. The solution was put into a reactor at 60° C., and $NH_3H_2O$ was input while stirring at a constant speed so that a pH became 10.5. NaOH was introduced into the reactor at a constant rate so that a molar ratio of transition metals in the prepared transition metal solution and NaOH became 1:2. $NH_3H_2O$ was added to 4 times or more of the number of moles of the transition metals in the process above, and a co-precipitation reaction was performed for 48 hours to prepare a preliminary active material precursor.

The preliminary active material precursor was heat-treated in an oven at 120° C. for 10 hours to obtain a cathode active material precursor.

Lithium hydroxide and the cathode active material precursor were added in a ratio of 1.05:1 to a dry high-speed mixer and uniformly mixed for 5 minutes. The mixture was placed in a kiln, and a temperature was raised to 750° C. at a heating rate of 2° C./min, and maintained at 750° C. for 10 hours. Oxygen was passed continuously at a flow rate of 10 mL/min during the temperature increase and maintenance. After the calcination, natural cooling was performed to room temperature, followed by pulverization and classification to prepare a cathode active material in the form of single particles (including crystallographically single crystal and polycrystalline structure) of $LiNi_{0.80}Co_{0.10}Mn_{0.10}O_2$.

Fabrication of Secondary Battery

A cathode mixture was prepared by mixing the cathode active material, Denka Black as a conductive material, and PVDF as a binder in a mass ratio of 94:3:3, respectively. The cathode mixture was coated on an aluminum current collector, dried and pressed to prepare a cathode. An electrode density of the cathode was adjusted to 3.5 g/cc or more after the pressing 93 wt % of natural graphite as an anode active material, 5 wt % of KS6 as a flake type conductive material, 1 wt % of styrene-butadiene rubber (SBR) as a binder, and 1 wt % of carboxymethyl cellulose (CMC) as a thickener were mixed to form an anode slurry. The anode slurry was coated on a copper substrate, dried and pressed to prepare an anode.

The cathode and the anode prepared as described above were each notched by a predetermined size, and stacked with a separator (polyethylene, thickness: 25 µm) interposed therebetween to form an electrode cell. Each tab portion of the cathode and the anode was welded. The welded cathode/separator/anode assembly was inserted in a pouch, and three sides of the pouch except for an electrolyte injection side were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by forming 1M $LiPF_6$ solution in a mixed solvent of ethylene carbonate (EC)/ethyl methyl carbonate (EMC)/diethylene carbonate (DEC) (25/45/30; volume ratio), and then 1 wt % of vinylene carbonate, 0.5 wt % of 1,3-propensultone (PRS) and 0.5 wt % of lithium bis(oxalato)borate (LiBOB) were added.

Comparative Example 1

A cathode active material and a secondary battery were prepared by the same method as that in Example 1, except that the molar ratio of the transition metals in the transition metal solution and NaOH was 1:2.5 and the reactor temperature was adjusted to 75° C. when synthesizing the preliminary active material precursor in the preparation of the cathode active material.

Example 2

A cathode active material and a secondary battery were prepared by the same method as that in Example 1, except that the molar ratio of $NiSO_4$, $CoSO_4$, and $MnSO_4$ was adjusted to 90:5:5 and the molar ratio of the transition metals and NaOH to 1:1.4 when synthesizing the preliminary active material precursor in the preparation of the cathode active material.

Example 3

A cathode active material and a secondary battery were prepared by the same method as that in Example 2, except that the molar ratio of the transition metals and NaOH was changed to 1:1.6.

Example 4

A cathode active material and a secondary battery were prepared by the same method as that in Example 2, except that the molar ratio of the transition metals and NaOH was changed to 1:1.8.

Example 5

A cathode active material and a secondary battery were prepared by the same method as that in Example 2, except that the molar ratio the molar ratio of the transition metals and NaOH was changed to 1:2.

Example 6

A cathode active material and a secondary battery were prepared by the same method as that in Example 2, except that the molar ratio of the transition metals and NaOH in the transition metal solution was 1:2.5 and the reactor temperature was adjusted to 50° C. when synthesizing the preliminary active material precursor in the preparation of the cathode active material.

Comparative Example 2

A cathode active material and a secondary battery were prepared by the same method as that in Example 2, except that the molar ratio of the transition metals and NaOH was changed to 1:1.

Comparative Example 3

A cathode active material and a secondary battery were prepared by the same method as that in Example 2, except that the molar ratio of the transition metals and NaOH in the transition metal solution was 1:2.5 and the reactor temperature was changed to 75° C. when synthesizing the preliminary active material precursor in the preparation of the cathode active material.

Example 7

A cathode active material and a secondary battery were prepared by the same method as that in Example 1, except that the molar ratios of $NiSO_4$, $CoSO_4$ and $MnSO_4$ were changed to 94:3:3, respectively.

Example 8

A cathode active material and a secondary battery were prepared by the same method as that in Example 7, except that the temperature of the heat-treating the cathode active material precursor and lithium hydroxide was changed to 840° C. in the preparation of the cathode active material.

Comparative Example 4

A cathode active material and a secondary battery were prepared by the same method as that in Example 7, except that the molar ratio of the transition metals and NaOH in the transition metal solution was 1:2.5 and the reactor temperature was changed to 75° C. when synthesizing the preliminary active material precursor in the preparation of the cathode active material.

Comparative Example 5

A cathode active material and a secondary battery were prepared by the same method as that in Example 7, except that the molar ratio of the transition metals and NaOH in the transition metal solution was 1:3 and the reactor temperature was changed to 75° C. when synthesizing the preliminary active material precursor in the preparation of the cathode active material.

Comparative Example 6

A cathode active material and a secondary battery were prepared by the same method as that in Example 7, except that the molar ratio of the transition metals and NaOH was changed to 1:1.

Experimental Example 1

(1) XRD Analysis

Crystallite sizes of a (003) plane and a (104) plane in the cathode active materials of Examples and Comparative Examples were measured by an XRD analysis and the Scherrer equation of Equation 2, and a crystallite size ratio of Equation 1 was calculated.

Specific XRD analysis equipment/conditions were shown in Table 1 below.

TABLE 1

| XRD(X-Ray Diffractometer) EMPYREAN | |
| --- | --- |
| Maker | PANalytical |
| Anode material | Cu |
| K-Alpha1 wavelength | 1.540598 Å |
| Generator voltage | 45 kV |
| Tube current | 40 mA |
| Scan Range | 10~120° |
| Scan Step Size | 0.0065° |
| Divergence slit | ¼° |
| Antiscatter slit | ½° |

(2) Evaluation on Initial Efficiency

The lithium secondary batteries prepared according to Examples and Comparative Examples were charged (CC-CV 0.1 C 4.3V 0.005 C CUT-OFF) in a chamber at 25° C. and a battery capacity (an initial charge capacity) was measured. The batteries were discharged again (CC 0.1 C 3.0 V CUT-OFF) and a battery capacity (an initial discharge capacity) was measured.

An initial capacity efficiency was evaluated by converting a value obtained by dividing the initial discharge capacity by the initial charge capacity as a percentage (%).

The evaluation results are shown in Table 2 below.

TABLE 2

| | Ni molar ratio | crystallite size (nm) | | crystallite size ratio (D(003)/D(104)) | initial charge capacity (mAh/g) | initial discharge capacity (mAh/g) | initial efficiency (%) |
| --- | --- | --- | --- | --- | --- | --- | --- |
| | | (003) plane | (104) plane | | | | |
| Example 1 | 0.80 | 265 | 96 | 2.76 | 230 | 206 | 89.6 |
| Comparative Example 1 | | 270 | 76 | 3.55 | 227 | 201 | 88.5 |
| Example 2 | 0.90 | 296 | 196 | 1.51 | 235 | 214 | 91.1 |
| Example 3 | | 305 | 165 | 1.85 | 236 | 216 | 91.5 |
| Example 4 | | 300 | 120 | 2.50 | 237 | 218 | 92.0 |
| Example 5 | | 290 | 100 | 2.90 | 236 | 216 | 91.5 |
| Example 6 | | 294 | 96 | 3.06 | 235 | 212 | 90.2 |
| Comparative Example 2 | | 310 | 270 | 1.15 | 238 | 208 | 87.4 |
| Comparative Example 3 | | 302 | 86 | 3.51 | 238 | 207 | 87.0 |
| Example 7 | 0.94 | 350 | 118 | 2.97 | 250 | 225 | 90.0 |
| Example 8 | | 857 | 262 | 3.27 | 249 | 222 | 89.2 |
| Comparative Example 4 | | 356 | 95 | 3.75 | 244 | 217 | 88.9 |
| Comparative Example 5 | | 365 | 84 | 4.35 | 245 | 216 | 88.2 |

TABLE 2-continued

| | Ni | crystallite size (nm) | | crystallite | initial charge | initial discharge | initial |
|---|---|---|---|---|---|---|---|
| | molar ratio | (003) plane | (104) plane | size ratio (D(003)/D(104)) | capacity (mAh/g) | capacity (mAh/g) | efficiency (%) |
| Comparative Example 6 | | 195 | 138 | 1.14 | 253 | 182 | 72.0 |

Referring to Table 2, in Examples satisfying the crystallite size ratio in the range from 1.5 to 3.5, an initial efficiency of about 90% or more was generally provided. Additionally. even when the nickel content was increased, the crystallite size ratio was appropriately adjusted to increase the discharge capacity without lowering the efficiency.

Referring to Comparative Example 6, as the size of D(003) decreased, the initial efficiency was degraded compared to those from Examples.

What is claimed is:

1. A cathode active material for a lithium secondary battery having a structure of a lithium-nickel-based composite oxide, wherein a crystallite size ratio obtained by an X-ray diffraction (XRD) analysis defined by Equation 1 is in a range from 2.5 to 3.2, and D(003) exceeds 200 nm:

$$\text{crystallite size ratio} = D(003)/D(104) \qquad \text{[Equation 1]}$$

wherein, in Equation 1, D(003) is a crystallite size of a (003) plane measured by the XRD analysis, and D(104) is a crystallite size of a (104) plane measured by the XRD analysis.

2. The cathode active material for a lithium secondary battery of claim 1, wherein the lithium-nickel-based composite oxide is represented by Chemical Formula 1 below:

$$\text{Li}_b\text{Ni}_{1-x-y-z}\text{Co}_x\text{Mn}_y\text{M}_z\text{O}_{2+a} \qquad \text{[Chemical Formula 1]}$$

wherein, in Chemical Formula 1, $0 \leq x \leq 0.15$, $0 \leq y \leq 0.15$, $0 \leq z \leq 0.1$, $-0.5 \leq a \leq 0.1$, $0.9 \leq b \leq 1.2$, and M includes at least one element selected from the group consisting of Mg, Sr, Ba, B, Al, Si, Ti, Zr, Y and W.

3. The cathode active material for a lithium secondary battery of claim 1, wherein D(003) is greater than 200 nm, and less than or equal to 900 nm.

4. The cathode active material for a lithium secondary battery of claim 1, wherein D(003) is in a range from 230 nm to 900 nm.

5. The cathode active material for a lithium secondary battery of claim 1, wherein D(104) is in a range from 90 nm to 300 nm.

6. The cathode active material for a lithium secondary battery of claim 1, wherein D(104) is in a range from 90 nm to 200 nm.

7. The cathode active material for a lithium secondary battery of claim 1, wherein nickel is included in the largest molar ratio among elements except for lithium and oxygen in the lithium-nickel-based composite oxide.

8. The cathode active material for a lithium secondary battery of claim 7, wherein the molar ratio of nickel is in a range from 0.8 to 0.95.

9. The cathode active material for a lithium secondary battery of claim 1, wherein the lithium-nickel-based composite oxide has a single particle shape.

10. A lithium secondary battery, comprising:

a cathode comprising a cathode active material layer that comprises the cathode active material for a lithium secondary battery of claim 1; and an anode facing the cathode.

* * * * *